Patented June 3, 1924.

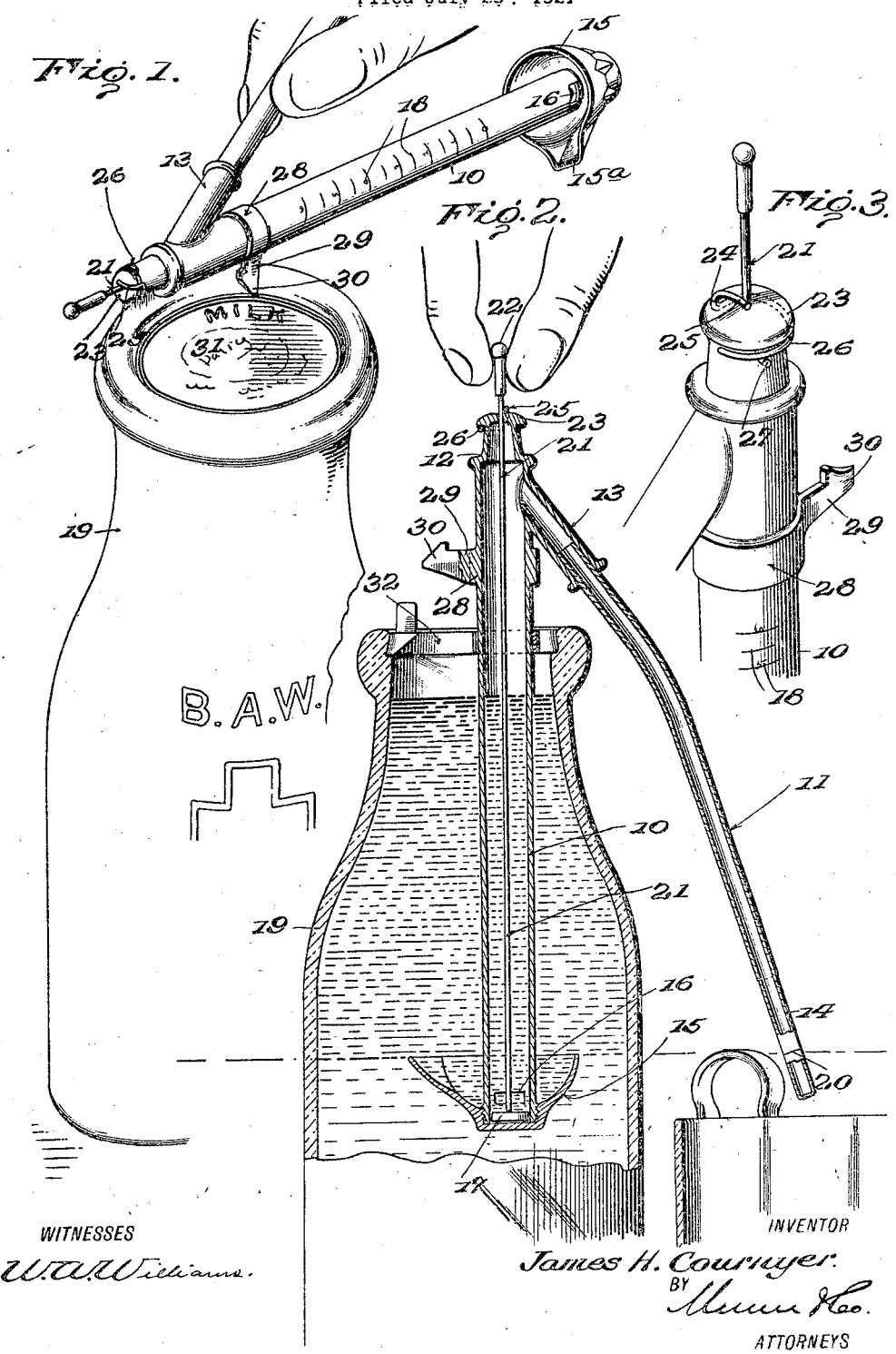

1,496,300

UNITED STATES PATENT OFFICE.

JAMES HERBERT COURNYER, OF OSKALOOSA, IOWA, ASSIGNOR TO SKIMIT MANUFACTURING COMPANY, OF OSKALOOSA, IOWA, A CORPORATION OF IOWA.

CREAM REMOVER.

Application filed July 29, 1921. Serial No. 488,418.

*To all whom it may concern:*

Be it known that I, JAMES H. COURNYER, a citizen of the United States, and a resident of Oskaloosa, in the county of Mahaska and State of Iowa, have invented certain new and useful Improvements in Cream Removers, of which the following is a specification.

My present invention relates generally to cream removers and more particularly to a siphon cream remover of the general type for which several patents have been issued to me, and my present improvements aim in particular to improve the construction shown in my Patent 1,355,539 granted October 12, 1920.

The improvements of my present application not only contemplate reduction in number of parts but also provides for more ready assembly and disassembly as well as for more effective cleaning when disassembled and these and other aims of the invention will be better understood from the following description in which reference is made to the accompanying drawing, forming part of this specification, and wherein, Figure 1 is a perspective view showing my improved cream remover in position for detaching a bottle cap, Figure 2 is a central vertical sectional view through the cream remover in operative position, certain portions being seen in side elevation, and Figure 3 is a detail perspective view of the upper portion of my improved device.

Referring now to these figures my invention includes an intake tube 10 and an outlet tube 11, the former of which has a centrally apertured cap 12 at its upper end and a downwardly inclined acutely angular nipple 13 which latter has a tapering bore to receive and snugly engage the upper end of the outlet tube 11. The outlet tube 11 is slightly bent at a point intermediate its ends and turned in at its lower outer end so as to prevent cream within the intake tube 10 from running back out of the lower end of said tube when siphon action, produced in a manner to be presently described, is broken.

The lower open end of the intake tube 10 is externally threaded to screw into a lower cup 15 which constrains the cream to flow into the cup from above during use of the implement, the intake tube having a circumferentially slotted intake opening 16 in its wall above its said lower end and below the upper edge of the cup as well as above the lowermost point of travel of the plunger whereby with the plunger 17 in the lowermost position as in Figure 2 cream will run upwardly within the tube to the level of cream around the tube as also seen in Figure 2.

As shown in Figure 1 the intake tube may have external graduations 18 therealong which will indicate the amount of cream to be removed from bottle when any one of the graduation marks is placed on a level with the top of the cream in a 16 oz. or 32 oz. bottle. In order that the upper edge of the cup 15 may be effectively shifted to the cream line, the lower reduced portion 14 of the outlet tube may have a mark 20 on its surface in horizontal alinement with the upper edge of the cup as seen in Figure 2.

The plunger 17 is secured upon the lower end of a thin flexible stem 21 whose upper portion is journaled to slide and rotate through the central opening of the cap 12 whose upper external detachable head 22 forms a handle during manipulation of the plunger and is so spaced from the head 12 as to permit the plunger 17 to be forced downwardly beyond the lower open end of the intake tube 10 when the cup 15 is unscrewed and removed, such movement of the plunger providing for effective cleaning of the intake tube from end to end.

The plunger stem head 22 may likewise be utilized to thoroughly clean out the outlet tube 11 which the head slidably interfits, when the outlet tube is detached from the nipple 13.

A flange 23 surrounds the upper end of the cap 12 of the intake tube and this flange is cutaway or recessed at one point as at 24 in Figure 3 to permit of the passage of one angular end 25 of a friction spring 26 which is coiled around the head 12 and has its opposite end snapped over a laterally and externally projecting stud 27 of the head 12. The first mentioned angular end 25 of spring 26 is frictionally engageable due to lateral pressure, with the upper external portion of the plunger stem 21 so as to effectively hold the latter in upper position after the plunger has been drawn upwardly to start the siphon.

It will also be noted that the upper portion of the intake tube is annularly enlarged as at 28 below the nipple 13, from one point of which enlargement a radially projecting spur 29 extends having a sharpened headed end 30 for projection through the usual cardboard or other milk bottle cap 31 in the manner shown in Figure 1.

The intake tube 10 may be associated with a spring holder 32 for disposition in the mouth of the milk bottle 19 in the manner shown in Figure 2 and as also illustrated in my prior patent above referred to, and when so disposed, the intake tube 10 is shifted downwardly until the upper edge of the cup 15 is approximately at the cream line of the bottle or in other words until the mark 20 of the outer reduced end of the outlet tube 11 is about even with the cream line. Then plunger 17 having been previously lowered to the position shown in Figure 2, below the level of the intake opening 16 of tube 10, cream finds its way upwardly into the tube to the level of the cream therearound. By observing the external graduations 18 of the intake tube at this time the amount of cream indicated by any certain graduation can be removed. The handle 22 of the plunger stem 21 is then moved upwardly so that the column of cream above the plunger 17 is raised and finds its way into the upper end of the outlet tube 11 in advance of the plunger. The latter as it moves upwardly creates a suction which draws cream upwardly within the intake tube behind the plunger so that it is quite obvious the siphon will be started and will come into full operation when the plunger 17 is shifted into the cap 12 of the intake tube above the communicating upper end of the outlet tube. This siphon action continues until the cream within the bottle 19 above the upper edge of the cup 15 is entirely exhausted and it is obvious that the reduced end 14 of the outlet tube 11 will avoid the cream standing in the intake tube 10 from running back in bottle after siphon action breaks. It also prevents cream remaining in outlet tube, from draining out on table.

Upon withdrawing the siphon cream remover as a whole from the bottle 19, what little cream remains within the cup 15, tubes 10 and 11, may be poured out of the same by virtue of the pouring lip 15ª with which this cup is provided at one side as shown in Figures 1 and 2.

It is quite obvious from the foregoing that in cleaning the device the fact that the plunger 17 is capable of movement throughout the entire length of the intake tube means considerable aid in this operation, the cup 15 being first unscrewed from the lower end of the intake tube. It is also obvious that the mere frictional engagement of the upper end of the outlet tube 11 with the acutely angular nipple 13 provides for ready detachment of this outlet tube so that upon detachment, the reduced portion may be used to clean nipple 13, the head 22 of the plunger stem may be passed through the outlet tube in order to thoroughly cleanse the latter. The fact that this stem 21 of the plunger is in the present instance thin and flexible admits of ready yielding to the curvature of the outlet tube.

I claim:

1. A siphon cream remover including an intake tube having an externally threaded lower end and an intake opening through its wall above its threads, a cup having threads to engage the threads of the tube and having a portion against which the lower end of the intake tube seats entirely therearound, a plunger within the tube shiftable in lowermost position below the said intake opening, a stem connected at its lower end to the plunger and slidable through and beyond the upper end of the tube, a nipple communicating with the upper portion of the tube and extending outwardly and downwardly at an acute angle therethrough, and an outlet tube having one end engageable and frictionally held within the said nipple and having a reduced portion associated with its opposite end, and a head on the upper external end of the plunger stem formed to slidably interfit the outlet tube as described.

2. A siphon cream remover including inlet and outlet tubes in communicating relation and a siphon starting plunger, said inlet tube having an apertured upper end above the communicating end of the outlet tube, a stem connected to the plunger and projecting externally through the said opening, said upper end of the intake tube having a laterally projecting stud and a surrounding flange above the stud provided with a recess, and a spring around the upper end of the intake tube having its lower end held between the flange and the said stud and having an upper angular end projecting through the recess of the flange and across the upper end of the tube and into frictional engagement with the external portion of the plunger stem to hold the latter against accidental displacement during siphon action.

JAMES HERBERT COURNYER.